(12) United States Patent
Walton et al.

(10) Patent No.: US 8,997,611 B1
(45) Date of Patent: Apr. 7, 2015

(54) BEARING ASSEMBLY FOR USE WITH A ROTATING MACHINING DEVICE

(71) Applicant: Tri Tool Inc., Rancho Cordova, CA (US)

(72) Inventors: Joel Walton, Rancho Cordova, CA (US); Vinh Hoang, Rancho Cordova, CA (US)

(73) Assignee: Tri Tool Inc., Rancho Cordova, CA (US)

( * ) Notice: Subject to any disclaimer, the term of this patent is extended or adjusted under 35 U.S.C. 154(b) by 0 days.

(21) Appl. No.: 14/510,613

(22) Filed: Oct. 9, 2014

Related U.S. Application Data

(60) Provisional application No. 61/889,735, filed on Oct. 11, 2013.

(51) Int. Cl.
*B23B 5/08* (2006.01)
*B23Q 1/70* (2006.01)

(52) U.S. Cl.
CPC ... *B23Q 1/70* (2013.01); *B23B 5/08* (2013.01); *B23B 2260/008* (2013.01)

(58) Field of Classification Search
CPC ........ B23B 5/08; B23B 5/161; B23B 2215/12
USPC .............................. 82/113, 128, 130; 384/451
See application file for complete search history.

(56) References Cited

U.S. PATENT DOCUMENTS

| | | | | |
|---|---|---|---|---|
| 253,679 | A | * | 2/1882 | Bussing .......................... 384/451 |
| 560,322 | A | * | 5/1896 | McGloin ......................... 384/451 |
| 575,618 | A | * | 1/1897 | Schon ............................. 384/451 |
| 640,397 | A | * | 1/1900 | Merker ........................... 384/451 |
| 667,684 | A | * | 2/1901 | Deharde ......................... 384/451 |
| 1,876,914 | A | | 9/1932 | Gordon |
| 3,192,001 | A | * | 6/1965 | Karge, Jr. ....................... 384/451 |
| 3,795,429 | A | * | 3/1974 | Peyrot ............................ 384/451 |

(Continued)

FOREIGN PATENT DOCUMENTS

| | | |
|---|---|---|
| DE | 1 966 974 U | 8/1967 |
| WO | 2008/052106 A2 | 5/2008 |

OTHER PUBLICATIONS

International Search Report from corresponding International Application No. PCT/US2014/060912, Dec. 22, 2014.

(Continued)

*Primary Examiner* — Daniel Howell
*Assistant Examiner* — Ryan Rufo
(74) *Attorney, Agent, or Firm* — Workman Nydegger

(57) ABSTRACT

A rotating machining device includes a segmented support housing arranged to be mounted on a work piece and a segmented headstock mounted on the support housing and rotatable relative to the support housing about an axis. The rotating machining device also includes at least one bearing assembly disposed between the headstock and the support housing. The at least one bearing assembly includes a first race having a first set of bearing elements arranged to dynamically contact a first portion of the headstock and reciprocate within the bearing assembly in a first direction. The at least one bearing assembly also includes a second race having a second set of bearing elements arranged to dynamically contact a second portion of the headstock and recirculate within the bearing assembly in a second direction opposite the first direction so as to promote distribution of a load applied to the bearing assembly.

20 Claims, 10 Drawing Sheets

(56) References Cited

U.S. PATENT DOCUMENTS

| | | | |
|---|---|---|---|
| 4,418,591 A | 12/1983 | Astle | |
| 4,543,861 A | 10/1985 | Kwech et al. | |
| 4,677,884 A | 7/1987 | Kwech et al. | |
| 4,739,685 A * | 4/1988 | Ricci | 82/113 |
| 4,754,672 A * | 7/1988 | VanderPol | 82/113 |
| 4,939,964 A | 7/1990 | Ricci | |
| 5,368,399 A | 11/1994 | Tremblay | |
| 5,429,021 A | 7/1995 | Astle et al. | |
| 5,549,024 A | 8/1996 | Ricci | |
| 6,257,110 B1 | 7/2001 | Ricci et al. | |
| 6,615,696 B2 | 9/2003 | Ricci et al. | |
| 7,320,268 B2 | 1/2008 | Kawashima | |
| 7,967,511 B2 * | 6/2011 | Aida | 384/451 |
| 8,051,753 B2 | 11/2011 | Ricci et al. | |
| 8,250,953 B2 | 8/2012 | Hall et al. | |
| 2005/0132851 A1 * | 6/2005 | Place | 82/113 |
| 2010/0162860 A1 | 7/2010 | Hall et al. | |
| 2011/0219920 A1 | 9/2011 | Arnemann | |
| 2011/0314978 A1 | 12/2011 | Phillips, II et al. | |
| 2013/0014937 A1 | 1/2013 | Krohn et al. | |

OTHER PUBLICATIONS

International Search Report from corresponding International Application No. PCT/US2014/059875, Jan 8, 2015.

* cited by examiner

BEARING ASSEMBLY FOR USE WITH A ROTATING MACHINING DEVICE

TECHNICAL FIELD

The disclosure relates to a bearing assembly for use with a rotating machining device.

BACKGROUND

Clamshell pipe lathes generally comprise first and second semicircular halves that are designed to be joined to surround a pipe to be machined. The resulting annular assembly includes a stationary ring portion that becomes clamped to the pipe and an abutting rotatable portion including a gear ring attached to the stationary ring portion for rotation about the concentrically disclosed pipe. A motor is operatively coupled to the assembly and includes a gear drive designed to mesh with the gear ring on the rotatable portion of the lathe. Bearing assemblies are typically disposed between the stationary ring portion and the rotatable portion. One conventional bearing system used in clamshell pipe lathes is a V-groove guide bearing system. These bearing systems are self-contained units holding small ball bearings that rotate on a fixed axis and transfer loads from the rotatable portion to the stationary portion of the lathe.

The size and space taken up by V-groove guide bearings, compared to the actual bearing size, is disproportional and limits the number of bearing units and/or elements that can fit into the pipe lathe. In the V-groove guide bearing system each bearing unit or element is independently adjustable. If all of the bearing units or elements are not properly adjusted some of the bearing units or elements may not be in proper contact within the system, reducing bearing support and cutting performance. Further, V-groove guide bearings have a limited carrying capacity for heavy axial loads, since they are only intended to carry radial loads. In addition, V-groove guide bearings have a tendency to form unwanted witness lines in the surface of the pipe caused by the rotational portion coming in direct and repeat contact with the fixed bearing element location at the split-line where the two halves join.

Another type of conventional bearing system used in clamshell pipe lathes is an adjustable sliding bearing. This system provides high radial and axial thrust loads and superior surface finishes. However, this system is limited because it cannot scale up to larger pipe sizes and has to operate at slower speeds due to excessive heat generated by the sliding surfaces. This excessive heat causes the material to change in size, which changes the clearances between the bearing surfaces. Further, to overcome overheating issues, design modifications to these conventional sliding bearing systems have resulted in added weight and size, which makes the pipe lathe harder to use and more costly. In addition, this bearing design, like the V-guided bearing design, requires significant area to be dedicated to accommodate the placement of components within their adjoining stationary rings, thus reducing the overall clamping strength of the overall structure.

SUMMARY

The bearing assembly is described in a pipe lathe adaptable to a variety of configurations and has various features. While described in this context, the features may be adapted in other types of rotating machining devices other than the exemplary pipe lathe.

Certain features include multiple sets of bearing elements, bearing element retainer arrangements, race arrangements, and other contributing features to improve the safety of pipe lathe operators and to increase bearing performance.

Embodiments of the bearing assembly can include a first race and a second race arranged to be disposed within a portion of a pipe lathe and between the headstock and the support housing. The first race can include a first set of bearing elements arranged to contact a first portion of the headstock and to recirculate within the bearing assembly. The second race can include a second set of bearing elements arranged to contact a second portion of the headstock and to recirculate within the bearing assembly. Because the bearing assembly includes multiple sets of bearing elements contacting different portions of the headstock, the bearing assembly can reduce friction and facilitate smoother and easier rotation of the headstock in a more compact and efficient manner than in the prior art. Further, the number of bearing elements that can be fitted into the bearing assembly is greater than in the prior art, which can increase the load capacity of the bearing assembly.

The first set of bearing elements can be rotated and roll on the first race such that the contact points between the first set of bearing elements and the first portion of the headstock are dynamic (e.g., momentary and constantly changing) and the second set of bearing elements can be rotated and roll on the second race such that the contact points between the second set of bearing elements and the second portion of the headstock are dynamic, reducing two bearing elements contacting a split line of the pipe lathe at the same time. This is advantageous because if two bearing elements may simultaneously contact the split line, a skip or interruption can be produced that can then transfer to the work piece as a witness mark, or wave.

A witness mark or wave can show up as a visible line in the machined surface of a work piece and is worsened by the split line intersecting the traditional fixed V-guided bearing(s) arrangement mounted within the stationary housing. The witness line depth and severity worsens over time and age of the machine as the rotating element wears. In contrast to the fixed contact points of the traditional V-guided bearings, the bearing assembly provides for multi dynamic contact locations of two or more bearing elements as they intersect with the split line, reducing or eliminating witness marks, which allows for superior surface finishes.

The dynamic contact between the first and second sets of bearing elements and the headstock can also generate less heat and friction than conventional V-guided and sliding bearing systems, allowing the pipe lathe to operate at lower operating temperatures and increasing power transmission efficiency.

According to a variation, the first set of bearing elements and the second set of bearing elements can be arranged to carry both radial and axial loads rather than carrying only radial or axial loads as in the prior art, substantially increasing the versatility and operational performance of the bearing assembly, which increases the performance of the pipe lathe.

According to a variation, the first set of bearing elements can travel at a different speed than the second set of bearing elements. This traveling speed differential between the first set of bearing elements and the second set of bearing elements can reduce two bearing elements contacting the split line, which reduces witness marks on the work piece.

According to a variation, the first set of bearing elements and the second set of bearing elements can be arranged to circulate or travel about the bearing assembly in different directions. This has the effect of reducing two bearing elements contacting the split line at the same time. This also advantageously dissipates heat and more efficiently distributes applied loads throughout the bearing assembly than in the prior art, increasing the operational life of the bearing assembly and the pipe lathe.

Embodiments of the bearing assembly can be arranged to be operable and disposable within only a portion of a pipe lathe such that the pipe lathe can be disassembled or split along one or more split lines into different portions with the bearing assembly staying retained within its respective portion. This has the effect of reducing or eliminating bearing elements of the bearing assembly falling out of the pipe lathe during disassembly, making disassembly of the pipe lathe simpler and safer for an operator.

The numerous advantages, features and functions of the embodiments of the bearing assembly will become readily apparent and better understood in view of the following description and accompanying drawings. The following description is not intended to limit the bearing assembly, but instead merely provides exemplary embodiments for ease of understanding.

BRIEF DESCRIPTION OF THE DRAWINGS

These and other features, aspects, and advantages of the present disclosure will become better understood regarding the following description, appended claims, and accompanying drawings.

DETAILED DESCRIPTION OF VARIOUS EMBODIMENTS

Figure 1:
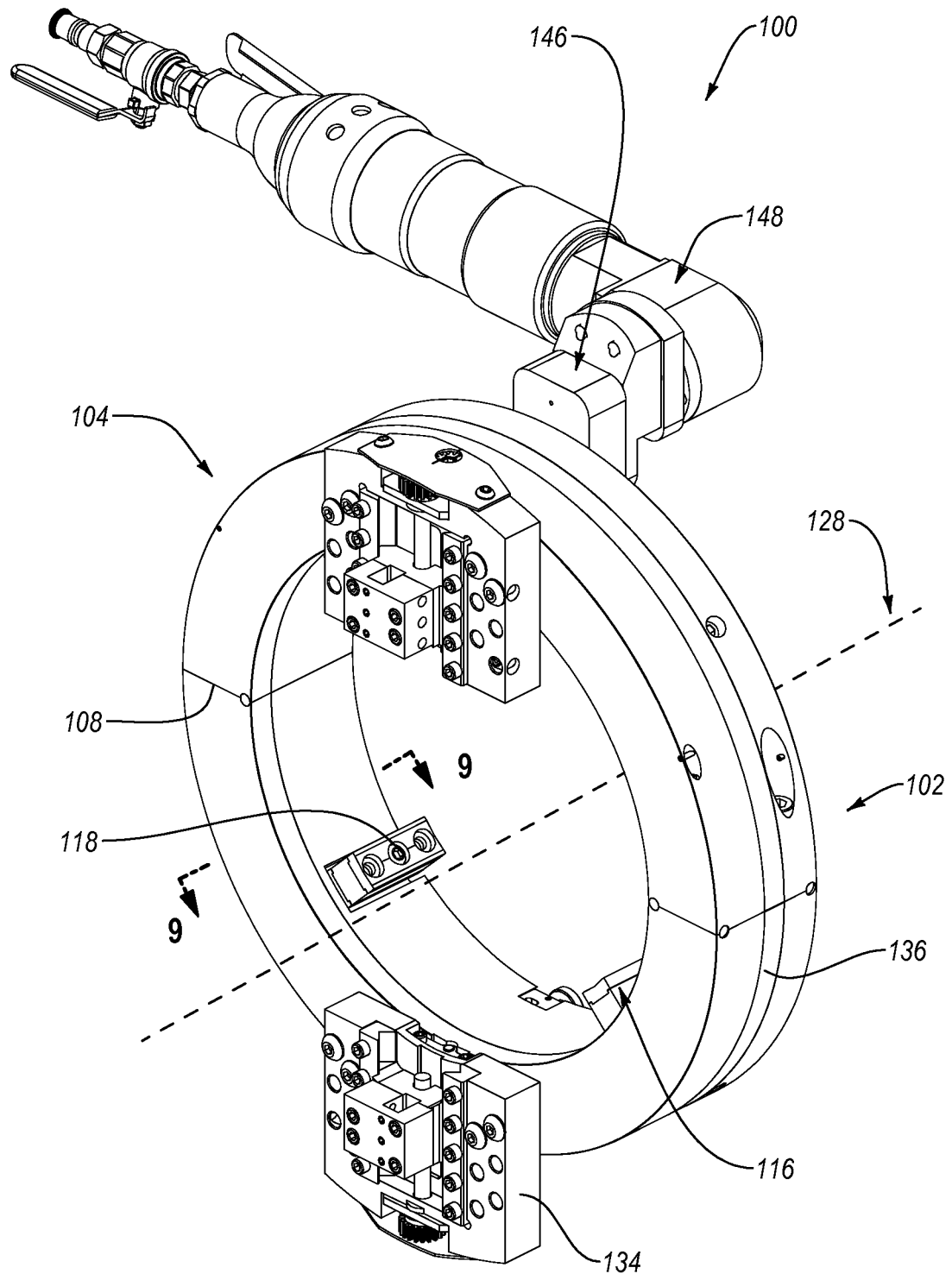
FIG. 1 is an isometric view of a pipe lathe according to an embodiment.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and described below. It should be understood, however, there is no intention to limit the disclosure to the embodiments disclosed, but on the contrary, that the intention covers all modifications, alternative constructions, combinations, and equivalents falling within the spirit and scope of the disclosure.

Figure 2:
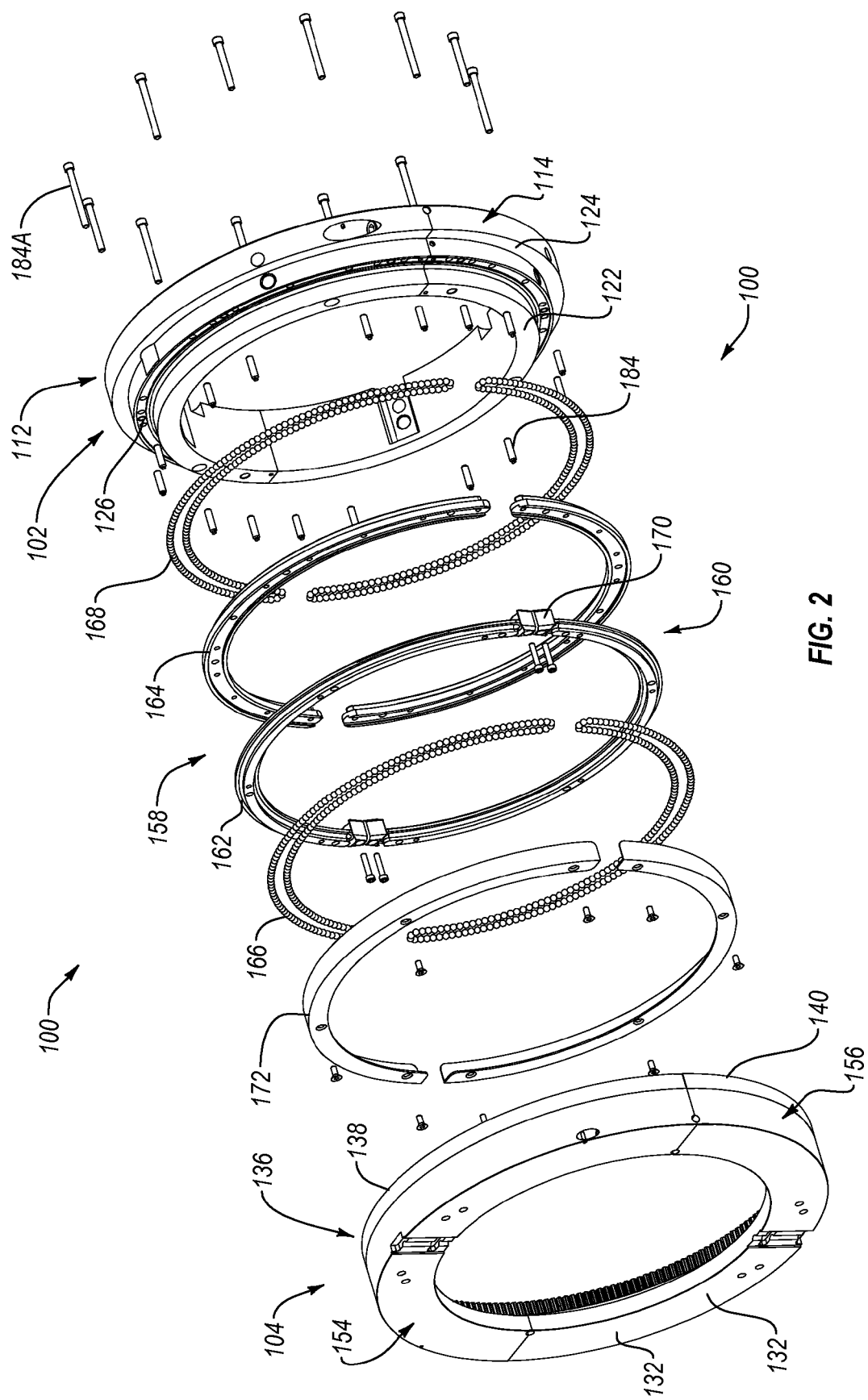
FIG. 2 is an exploded view of the pipe lathe in FIG. 1.

An exemplary embodiment of a rotating machining device comprising a pipe lathe 100 is shown in FIGS. 1 and 2. The pipe lathe 100 can include a support housing 102, a headstock 104, and a plurality of bearing assemblies 158, 160 (shown in FIG. 2). Both the support housing 102 and the headstock 104 can be segmented (e.g. split into two or more pieces) and arranged to be coupled together to form a complete assembly around a work piece (e.g., a pipe) to be machined. The work piece is supported concentrically by pipe lathe 100 relative to an axis of rotation 128 of the headstock 104.

The pipe lathe 100 can be split diametrically along a split line 108 with two arcuate or semicircular halves that are removably fastened. While the pipe lathe 100 is shown including two halves, the pipe lathe 100 can be constructed as four or any other suitable number of segments that may be joined around the work piece. While the pipe lathe 100 is described being mounted on the exterior perimeter of the work piece, in other embodiments, the pipe lathe 100 can be employed on the interior circumference or perimeter of the work piece. It will also be appreciated that while the pipe lathe 100 is shown having a generally circular shape, the pipe lathe 100 may have an oval shape, an elliptical shape, a tapered configuration, combinations thereof, or any other suitable shape.

The support housing 102 can be a generally annular member arranged to be concentrically clamped about the work piece. The support housing 102 can exhibit any suitable configuration. The support housing 102 can include two segments 112, 114 (shown in FIG. 2) that are removably coupled together. The first segment 112, which is shown and described as a first half 112 of the support housing 102, can be arranged to extend around or within a first portion of the perimeter of the work piece. The second segment 114, which is shown and described as a second half 114 of the support housing 102, can be arranged to extend around or within a second portion of the perimeter of the work piece. While the support housing 102 is shown comprising two halves, the support housing 102 can be constructed as three, four, or any suitable number of segments that may be joined about the work piece.

The support housing 102 can be formed of any suitable material. In an embodiment, the support housing 102 can include aluminum or other suitable metals. The support housing 102 can include a bottom side 120 (shown in FIG. 9) and an upper side 122 disposed opposite the bottom side 120 of the support housing 102. The upper side 122 of the support housing 102 can include an outer annular shoulder 124 that provides a space and support area for a gear ring described below. The upper side 122 of the support housing 102 also can include an inner annular shoulder 126 that provides a space and support area for the bearing assemblies 158, 160. For proper centering, a plurality of spacers 116 (e.g., feet or pads) (shown in FIG. 1) can be positioned about the interior wall surface of the support housing 102 and held in place by one or more bolts 118.

The headstock 104 can be mounted for rotation about axis 128 on the support housing 102. The headstock 104 can exhibit any suitable configuration. The headstock 104 can include a bottom side 130 (FIG. 9), which faces the upper side 122 of the support housing 102, and an upper side 132 disposed opposite the bottom side 130 of the headstock 104. Similar to the support housing 102, the headstock 104 can be segmented into a first segment 154 and a second segment 156. The bottom side 130 of the headstock 104 can include an annular recess 106 (shown in FIG. 9) bound by an outer peripheral wall 117 (FIG. 9) so that the top of the recess 106 is above (recessed within) the bottom side of the wall 117 to provide space for the bearing assemblies 158, 160. The bottom side 130 of the wall 117 also can be arranged to provide a support area for a gear ring described below.

The headstock 104 can be formed of any suitable material. The headstock 104 can be formed of medium-carbon alloy steel, carbon steel, stainless steel, tungsten carbide, combinations thereof, or another suitable material.

As seen in FIG. 1, one or more tool modules 134 can be connected to the upper side 132 of the headstock 104. Each tool module 134 can be arranged to mount a number of tools for machining (e.g., beveling, grooving, cutting, and/or other operations) the work piece. Two tool modules 134 are generally disposed on opposite sides (e.g., diametrically opposite sides) of the headstock 104. This has the effect of helping to create a neutral cutting force, whereby binding or twisting of the pipe lathe 100 can be generally avoided or minimized. The pipe lathe 100 can also include a tripper assembly to aid in operatively advancing the tool of the tool module 134 towards the work piece. The pipe lathe 100 can include any suitable tool modules and/or tripper assemblies.

Figure 9:
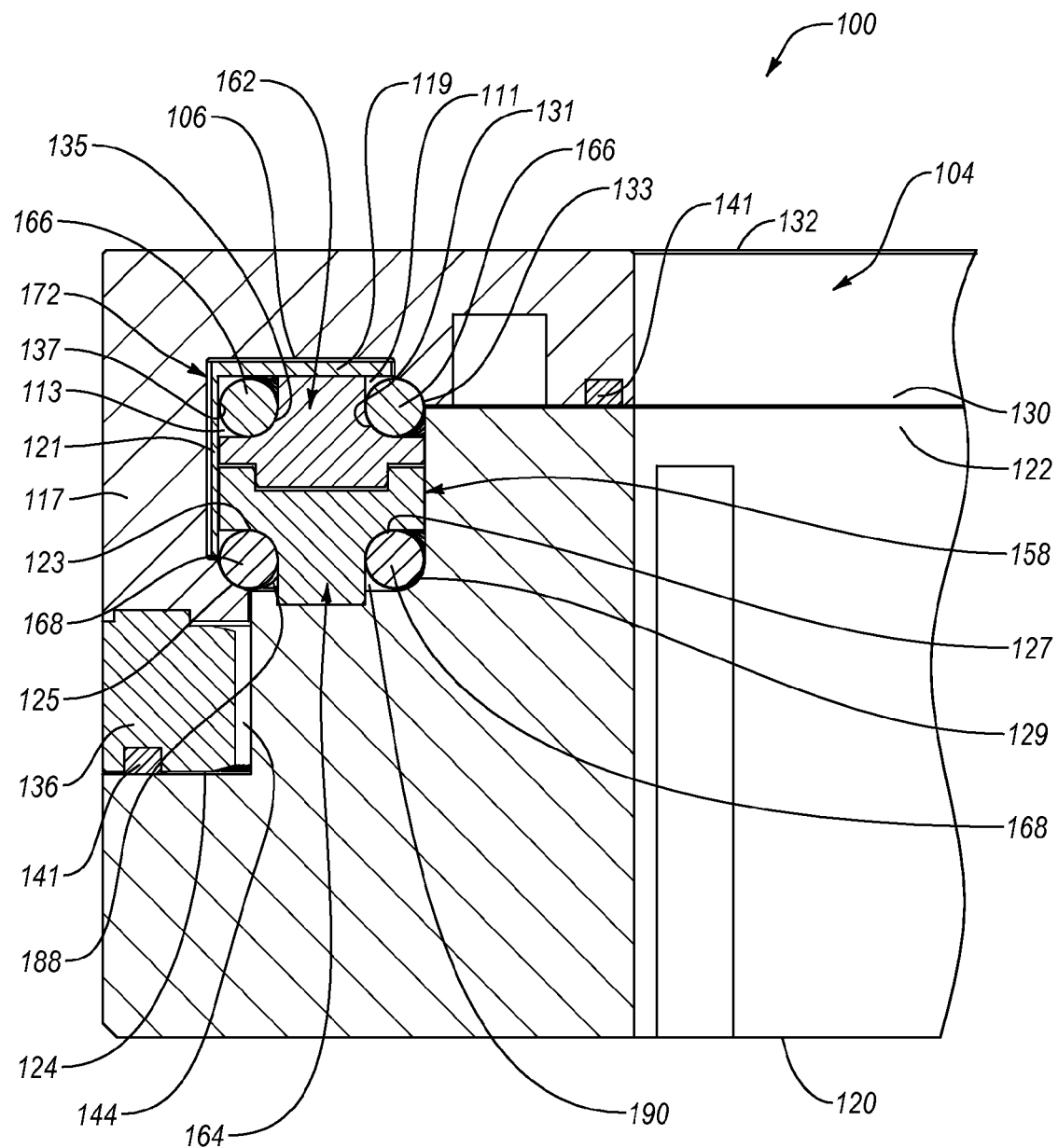
FIG. 9 is a partial cross-sectional view of the pipe lathe showing the bearing assembly in FIG. 1 according to an embodiment.

As best seen in FIGS. 1 and 9, a separate gear ring 136 can include a bottom side 138 and an upper side 140 disposed opposite the bottom side 138 of the gear ring 136. The upper side 140 of the gear ring 136 is arranged to face the bottom side of the headstock 104. The gear ring 136 can further include a plurality of apertures (not shown) for receiving a plurality of fasteners for fastening the gear ring 136 to the bottom side 130 of the headstock 104. More particularly, the fasteners can be configured to fasten the upper side 140 of the gear ring 136 to the bottom of the wall 117 of the headstock 104.

The gear ring 136 rotates with the headstock 104, but not independently with respect thereto. It will be appreciated that the gear ring 136 includes a plurality of segments. In the illustrated embodiment, the gear ring 136 includes a first segment and a second segment, although it should be appreciated that it could have three or more segments (not shown). While the gear ring 136 is shown and described as being separate from the headstock 104, in other embodiments, the gear ring 136 may be integral to the headstock 104.

The gear ring 136 can include a plurality of teeth 144 (shown in FIG. 9), the teeth 144 being formed on an inner radial surface of the gear ring 136. The teeth 144 can cooperate with a drive gear 146 (shown in FIG. 1) which is driven by a motor 148 (shown in FIG. 1), the motor 148 being mounted on the bottom side 120 of the support housing 102. More particularly, drive gear 146 meshes or cooperates with the teeth 144 on the gear ring 136 and when the drive gear 146 is driven by the motor 148, the gear ring 136 and the headstock 104 rotate. The motor 148 used may be air driven, hydraulically drive, or electrically driven. The pipe lathe 100 can include any suitable drive gear 146, teeth 144, and/or gear ring 136.

A plurality of bearing assemblies 158, 160 can be disposed between the support housing 102 and the headstock 104 that movably couple the headstock 104 to the support housing 102. The first bearing assembly 158 can be arranged to be disposed between the first segment 154 of the headstock 104 and the first segment 112 of the support housing 102. The second bearing assembly 160 can be arranged to be disposed between the second segment 156 of the headstock 104 and the second segment 114 of the support housing 102.

Figure 6:
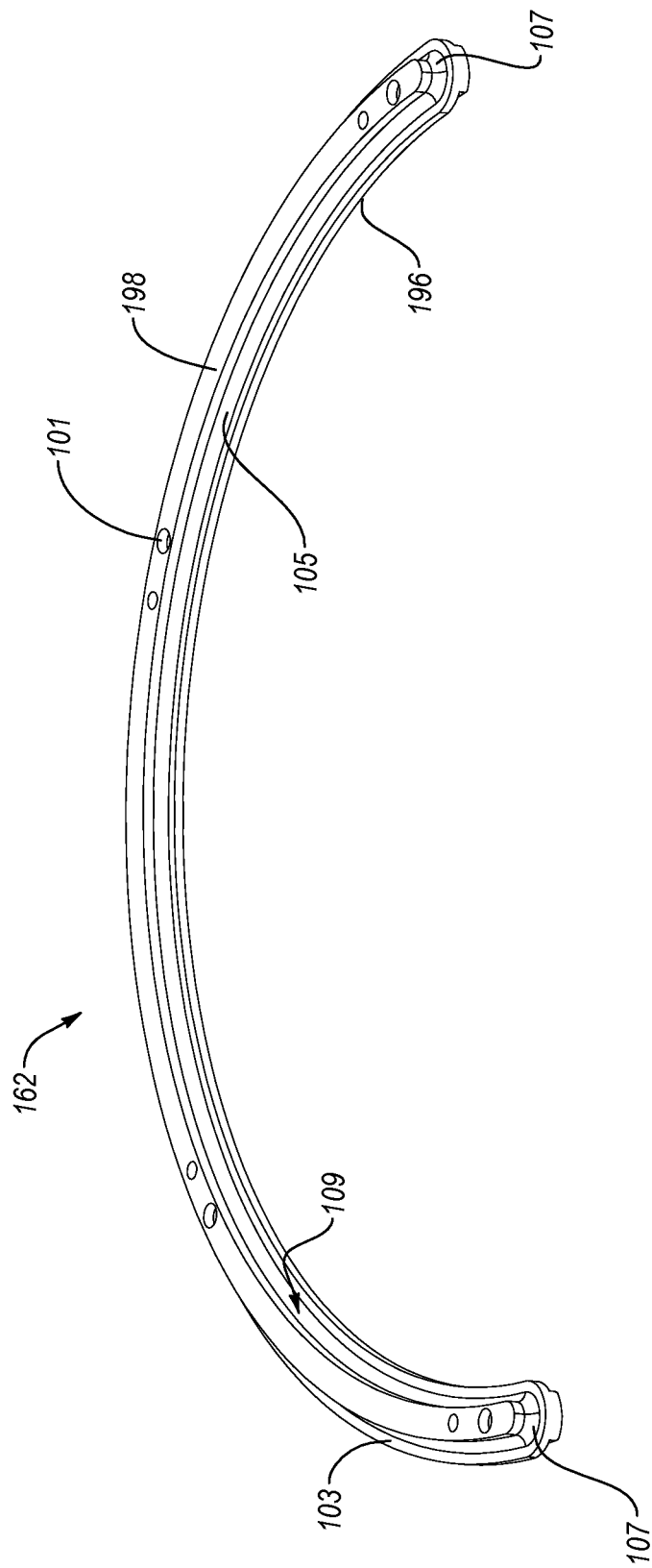
FIG. 6 is an upper isometric view of the upper race removed from the bearing assembly in FIG. 3 according to an embodiment.

The bearing assemblies 158, 160 can be supported on the inner radial shoulder 126 of the support housing 102 and bounded within the recess of the headstock 104 by the wall 117 (shown in FIG. 6). The bearing assemblies 158 and 160 are arranged to be independent of one another. Advantageously, this allow the pipe lathe 100 to be disassembled (e.g., split at the split lines 108) into separate halves with the bearing assemblies 158, 160 staying retained within their respective halves, which eliminates the bearing assemblies 158, 160 falling out of the pipe lathe 100.

The pipe lathe 100 is described including a first bearing assembly 158 and a second bearing assembly 160; however, it will be appreciated that the pipe lathe 100 could have three, four, or any suitable number of bearing assemblies, without departing from the disclosure. The pipe lathe 100 may include four bearing assemblies, each forming a quarter of a circle.

For simplicity of illustration and economy of disclosure, only one bearing assembly 158 will be described in further detail. It will be appreciated that the other bearing assembly 160 is preferably although not necessarily substantially similar. The bearing assembly 158 can exhibit any suitable configuration.

Figure 3:
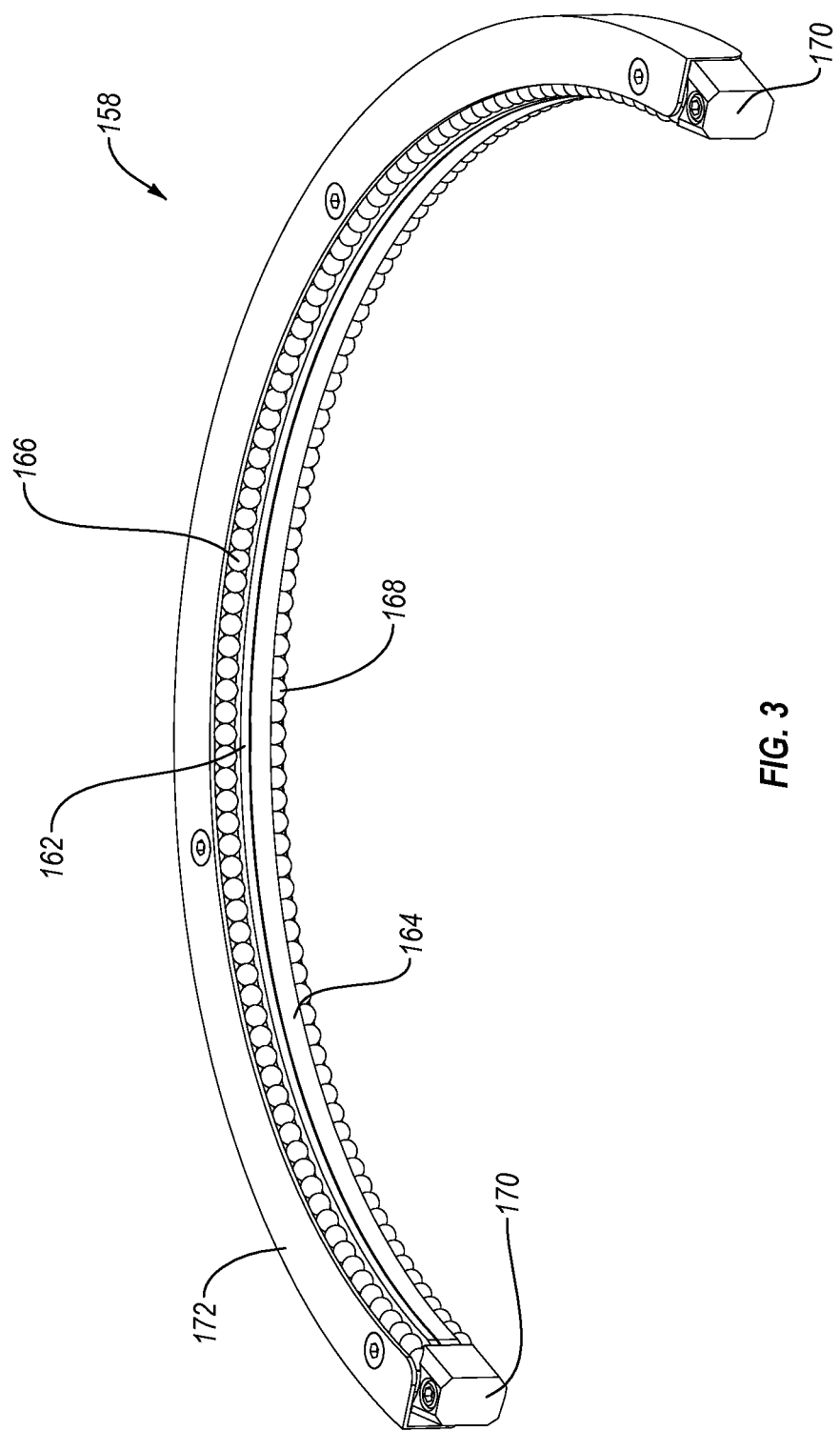
FIG. 3 is an isometric view of a bearing assembly according to an embodiment.

As shown in FIGS. 2 and 3, the bearing assembly 158 can be a recirculating bearing assembly including a first race or an upper race 162, a second race or lower race 164 secured to the upper race 162, a first plurality of upper bearing elements 166 arranged on the upper race 162, a second plurality of lower bearing elements 168 arranged on the lower race 164, bearing retainer end caps 170, and a bearing retainer cover 172.

Figure 4:
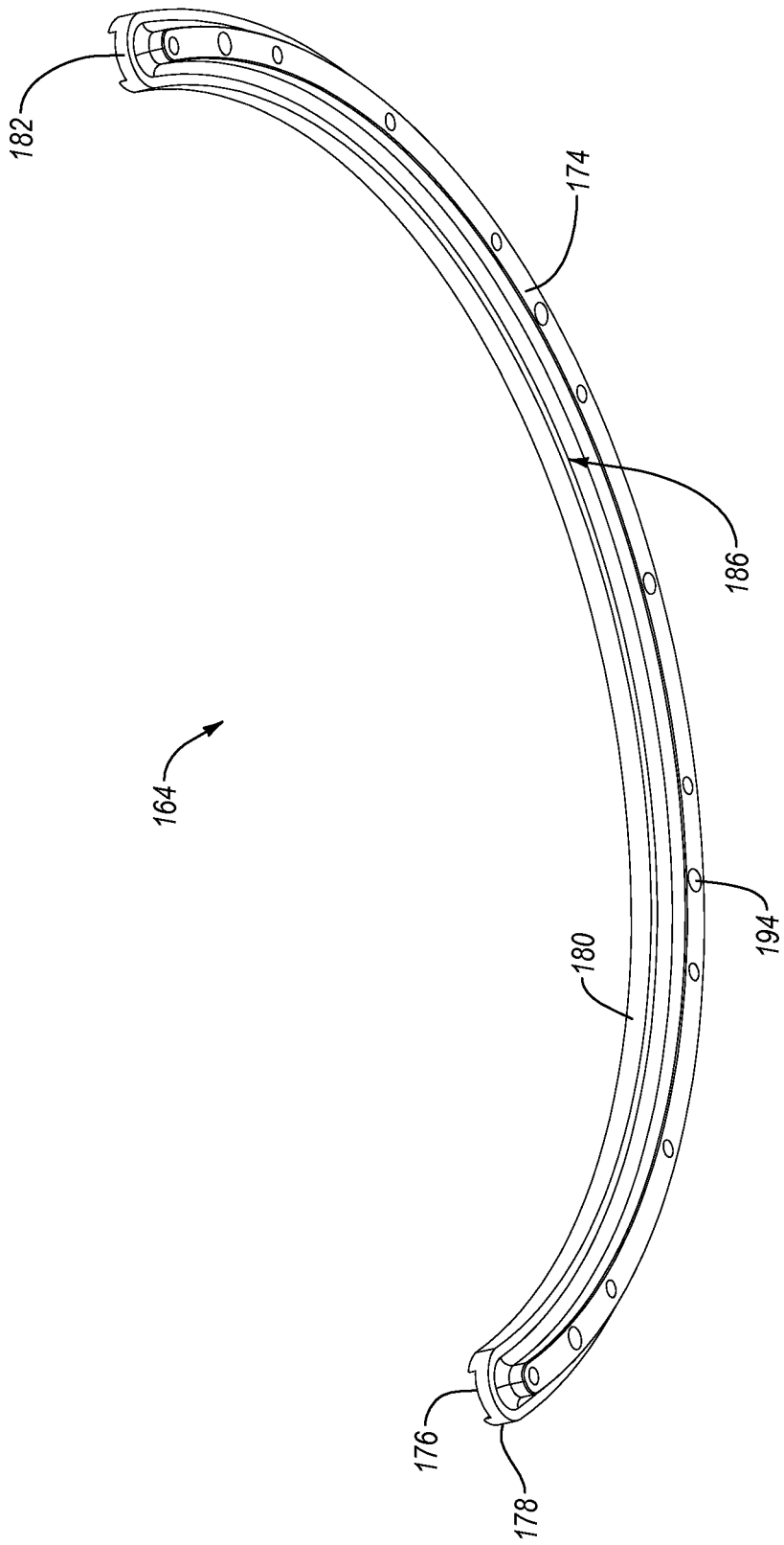
FIG. 4 is a lower isometric view of the lower race removed from the bearing assembly in FIG. 3 according to an embodiment.

FIG. 4 illustrates the lower race 164 removed from the bearing assembly 158 according to an embodiment for ease of reference. The lower race 164 may be made from any suitable material. The lower race 164 may comprise carbon steel, stainless steel, tungsten carbide, combinations thereof, or another suitable material. The lower race 164 can be an arcuate or substantially semicircular member that includes a bottom side 174 and an upper side 176 opposite the bottom side 174 of the lower race 164. The bottom side 174 of the lower race 164 can be arranged to face the upper side 122 of the support housing 102 (shown in FIG. 2). The lower race 164 can include a plurality of apertures 194, at least a portion thereof arranged to receive a plurality of fasteners 184 (shown in FIG. 2), which fasten the lower race 164 to the support housing 102 such that the lower race 164 is fixedly attached to the support housing 102.

The lower race 164 can include an outer radial surface 178, an inner radial surface 180, and a pair of end surfaces 182 extending between the outer radial surface 178 and the inner radial surface 180. A lower bearing track 186 can be formed on the lower race 164 that includes a concave surface and extends around the outer radial surface 178, the inner radial surface 180, and the end surfaces 182 of the lower race 164.

Figure 5:
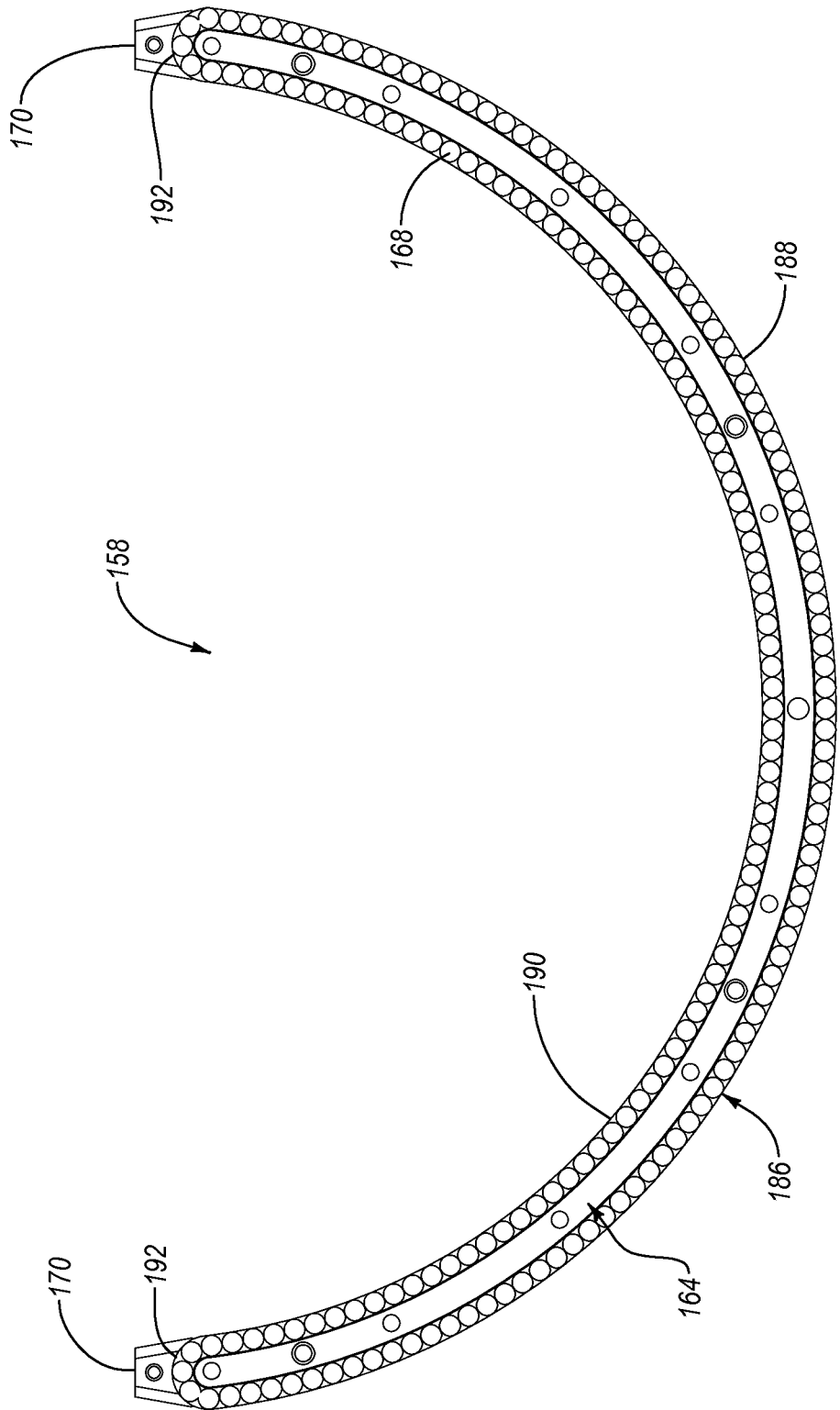
FIG. 5 is a bottom view of the bearing assembly in FIG. 3.

FIG. 5 is a bottom view of the bearing assembly 158 showing the arrangement of the lower bearing elements 168 on the lower race 164 according to an embodiment. The lower bearing elements 168 can be disposed on the concave surface of the lower bearing track 186. The lower bearing track 186 can include a load bearing portion 188 and a return portion 190. The lower bearing track 186 can include two turnarounds 192 which allow the lower bearing elements to turn about 180 degrees between the load bearing portion 188 and the return portion 190. This allows the lower bearing elements 168 to freely circulate around the lower bearing track 186.

The concave surface of the lower bearing track 186 may be substantially continuous. The concave surface of the lower bearing track 186 may vary. A portion of the concave surface formed in the outer radial surface 178 may have a first radius of curvature and another portion of the concave surface formed in the inner radial surface 180 may have a second radius of curvature different from the first radius of curvature.

FIG. 6 illustrates the upper race 162 removed from the bearing assembly 158 for ease of reference. The upper race 162 can be an arcuate or substantially semicircular member that includes a bottom side 196 and an upper side 198 opposite the bottom side 196. The bottom side 196 of the upper race 162 can be arranged to face the upper side 176 of the lower race 164. Similar to the lower race 164, the upper race 162 can include a plurality of apertures 101. At least some of the apertures 101 can receive one or more fasteners for fastening the upper race 162 to the lower race 164. At least some of the apertures 101 can receive one or more fasteners 184 members for adjusting the spatial relationship between the upper race 162 and the lower race 164.

The upper race 162 can be made from any suitable materials. The upper race 162 can include an outer radial surface 103, an inner radial surface 105, and a pair end surfaces 107 extending between the outer radial surface 103 and the inner radial surface 105. A first or upper bearing track 109 can be formed on the upper race 162 that includes a concave surface and extends around the outer radial surface 103, the inner radial surface 105, and the end surfaces 107 of the upper race 162. The upper bearing track 109 can be arcuate.

Figure 7:
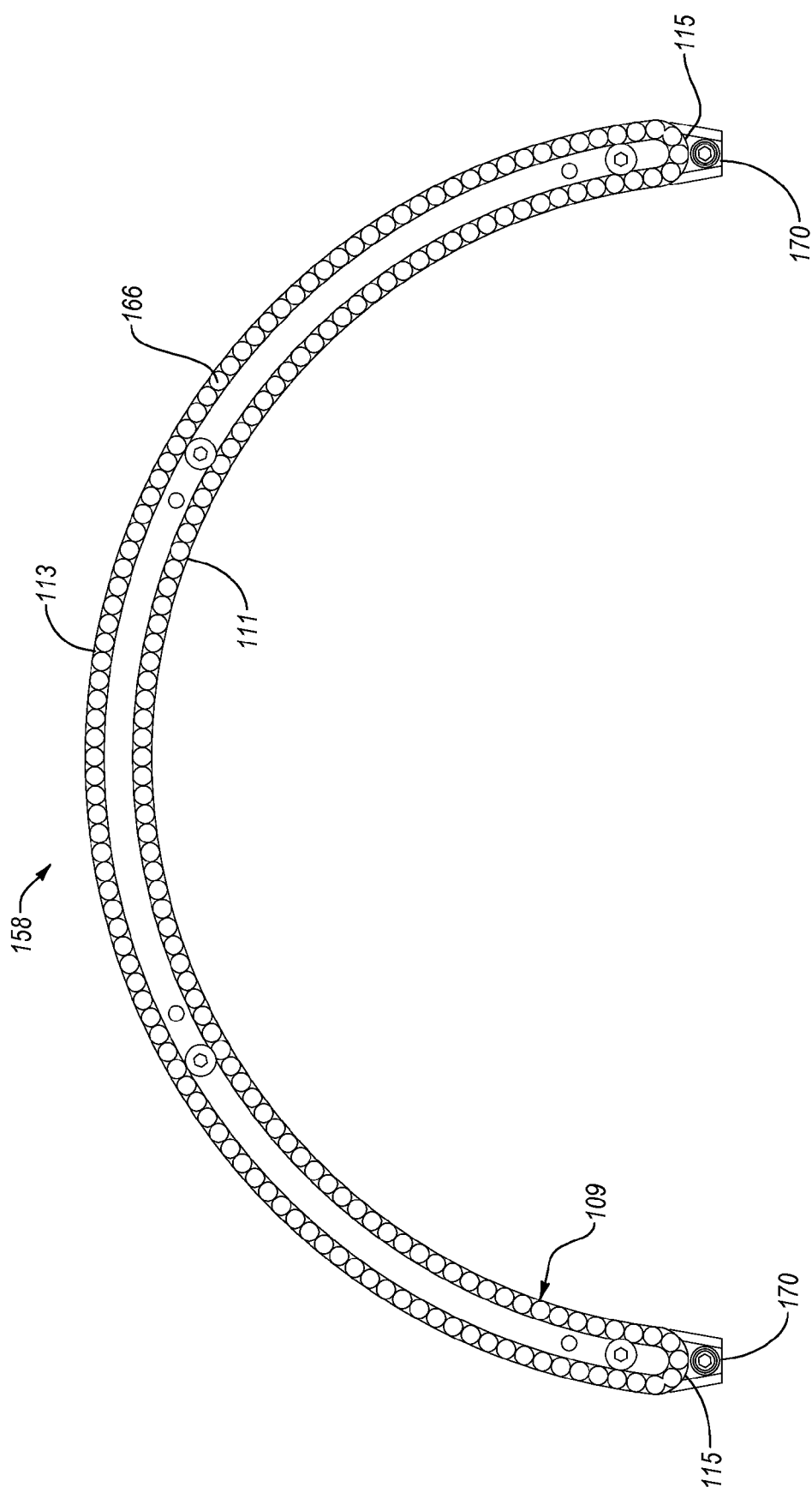
FIG. 7 is a top view of the bearing assembly in FIG. 3 with the retainer cover removed according to an embodiment.

FIG. 7 is a top view of the bearing assembly 158 showing the arrangement of the upper bearing elements 166 on the upper race 162 according to an embodiment. The upper bearing elements 166 can be disposed on the concave surface of the upper bearing track 109. The upper bearing track 109 can include a load bearing portion 111 and a return portion 113. The upper bearing track 109 can include two turnaround portions 115 which allow the upper bearing elements 166 to turn about 180 degrees between the load bearing portion 111 and the return portion 113. This has the effect of allow the upper bearing elements 166 to freely circulate about the upper bearing track 109. Similar to the concave surface of the lower bearing track 186, the concave surface of the upper bearing track 109 can be substantially continuous or it may be variable.

Because the bearing assembly 158 includes an upper and lower set of recirculating bearing elements contacting different portions of the headstock, the bearing assembly 158 can reduce friction and facilitate smooth and easy rotation of the headstock 104 in a more compact and efficient manner than in the prior art. The number of bearing elements that can be fitted into the bearing assembly 158 is greater than in the prior art, which increases the load capacity of the bearing assembly 158.

The lower bearing elements 168 and the upper bearing elements 166 can be substantially similar ball bearing elements. However, it will be appreciated that in other embodiments, the lower bearing elements 168 and the upper bearing elements 166 may be different. In an embodiment, the lower bearing elements 168 can be larger or smaller than the upper bearing elements 166. The lower bearing elements 168 and the upper bearing elements 166 may be formed of different materials. The upper bearing elements 166 may be formed of carbon steel and the lower bearing elements 168 may be formed of tungsten carbide. The bearing assembly 158 can include different bearing elements. The lower bearing elements 168 and/or the upper bearing elements 166 can be generally cylindrical bearing elements or any other bearing elements.

Figure 8:
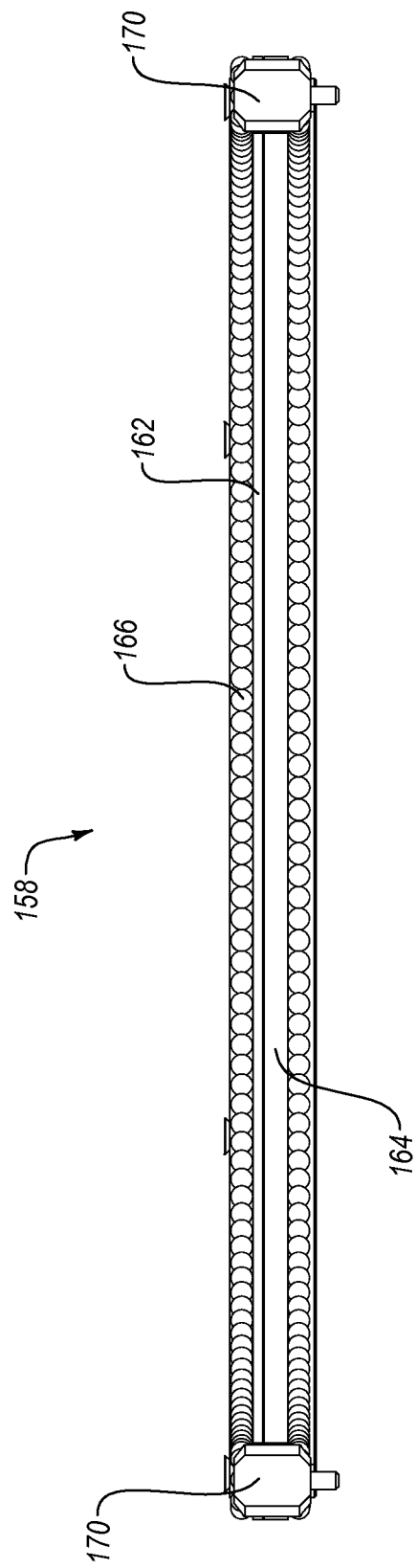
FIG. 8 is a front view of the bearing assembly in FIG. 3.

As seen in FIGS. 3 and 8, the bearing retainer end caps 170 can be attached to at least one of the end surfaces 182 of the lower race 164 or the end surfaces 107 of the upper race 162. This has the effect of preventing the bearing elements from falling out of the bearing assembly 158. For instance, when the pipe lathe 100 is split diametrically along split line 108, the bearing retainer end caps 170 retain the upper bearing elements 166 and lower bearing elements 168 of the bearing assembly 158 between the respective segments of the support housing 102 and the headstock 104, which makes assembly and/or disassembly of the pipe lathe 100 easier and safer than in the prior art where bearing elements can fall out of conventional bearing assemblies if the respective segments are not oriented in a direction.

The bearing retainer end caps 170 can be attached in any suitable manner and can exhibit any suitable configuration. At least one of the bearing retainer end caps 170 can be attached to the end surface 182 of the lower race 164 via a threaded fastener. At least one of the bearing retainer end caps 170 can include a concave or U-shaped turn groove facing the end surfaces of the upper and lower races 162, 164. The U-shaped groove can connect the load bearing portions and returns portions of the upper bearing track 109 and the lower bearing track 186. The bearing retainer end caps 170 can help align the lower and upper bearing elements within the upper bearing track 109 and the lower bearing track 186.

The retainer cover 172 can have any suitable configuration. For instance, the retainer cover 172 can be an arcuate or generally semicircular member including an upper wall 119 and an outer radial wall 121 extending downward from the upper wall 119. As seen in FIGS. 3 and 9, the bottom side of the upper wall 119 of the retainer cover 172 can be removably attachable to the upper side 198 of the upper race 162. The interior surface of the outer radial wall 121 of the retainer cover 172 can bound the outer radial surface 103 of the upper race 162 and at least a portion of the outer radial surface 178 of the lower race 164.

The retainer cover 172 can at least partially retain the upper bearing elements 166 in the loaded and return portions of the upper bearing track 109 and the lower bearing elements 168 in the load bearing portion 188 of the lower bearing track 186. If the headstock 104 is detached from the support housing 102, the retainer cover 172 can help retain the bearing elements within the bearing assembly 158. This in combination with the bearing retainer end caps 170 allows the bearing elements to stay retained within the bearing assembly 158 when the pipe lathe 100 is split into separate halves and the headstock 104 is removed from the support housing 102. Further, the retainer cover 172 can function to separate and align a portion of the upper bearing elements 166 and the lower bearing elements 168 from the headstock 104.

Optionally, the bearing assembly 158 can be adjustable. For instance, the bearing assembly 158 can include one or more features that allow for preload adjustments between the bearing elements, the upper and lower races 162 and 164, and the headstock 104. The bearing assembly can be adjustable radially inward and/or outward to maintain a proper connection between the gear ring 136 and drive gear 146. The plurality of fasteners 184 can include a plurality of set screws that can extend through the lower race 164 to push on the upper race 162. The set screws can be adjusted to separate the two races 162 and 164 at a predetermined distance.

One or more bolt members 184A can extend through the lower race 164 and attach to the upper race 162. The bolt members 184A can hold the two races 162 and 164 in a fixed position providing a preload pressure for the races while securing the bearing assembly 158 to the support housing 102. The bolt members 184A can be adjustable. The bolt members 184A can be arranged to pull the bearing assembly 158 back into the support housing 102 and to hold the bearing assembly 158 together as a single unit, helping to prevent vibration from backing out the set screw adjustments. This arrangement also provides a user the ability to move and/or adjust the pressure exerted on the upper race 162 and the upper bearing elements 166 and the lower race 164 and the lower bearing elements 168. This pressure adjustment can provide the bearing preload and take up dimensional slack.

This pressure adjustment can also adjust the dimensional gap between the headstock 104 and support housing 102 for disassembly or cleaning.

The arrangement of the bearing assembly 158 between the first segment 154 of the headstock 104 and the first segment 112 of the support housing 102 will now be described in more detail regarding FIG. 9. The bearing assembly 158 can be supported on the support housing 102 and received within the recess 106 of the headstock 104. More particularly, the bottom side 174 of the lower race 164 can be positioned within a radial slot formed in the inner annular shoulder 126 of the support housing 102. The upper side 176 of the lower race 164 can include a radial slot that receives a corresponding radial protrusion on the bottom side 196 of the upper race 162, helping to maintain the alignment of the bearing assembly 158.

The retainer cover 172 can cover the upper side 198 of the upper race 162 and the outer radial surface of the upper race 162 and the lower race 164. The exterior surface of the retainer cover 172 faces the top of the recess 106 and the interior surface of the wall 117 of the support housing 102. A portion of the outer radial surface of the support housing 102 faces the inner radial surface of the upper race 162 and the lower race 164.

The lower bearing elements 168 in the load bearing portion 188 of the lower bearing track 186 can be in contact with and arranged to cooperate with an inner raceway surface 123. The inner raceway surface 123 can include a portion of the concave surface on the lower bearing track 186 and an outer raceway surface 125 comprising a second portion of the headstock 104 or a concave surface formed in a portion of the wall 117 of the headstock 104 that extends radially inward. A raceway surface means a surface on which the bearing elements roll and/or reciprocate.

As the outer raceway surface 125 on the headstock 104 rotates it causes the lower bearing elements 168 in the load bearing portion 188 to rotate. Because the lower bearing elements 168 may circulate around the lower bearing track 186, the lower bearing elements 168 rotate and roll within the load bearing portion 188 of the lower bearing track 186. The contact points between the lower bearing elements 168 and the inner raceway surface 123 and the outer raceway surface 125 are dynamic, reducing or eliminating the formation of witness marks in a work piece as described in more detail below.

Figure 10:
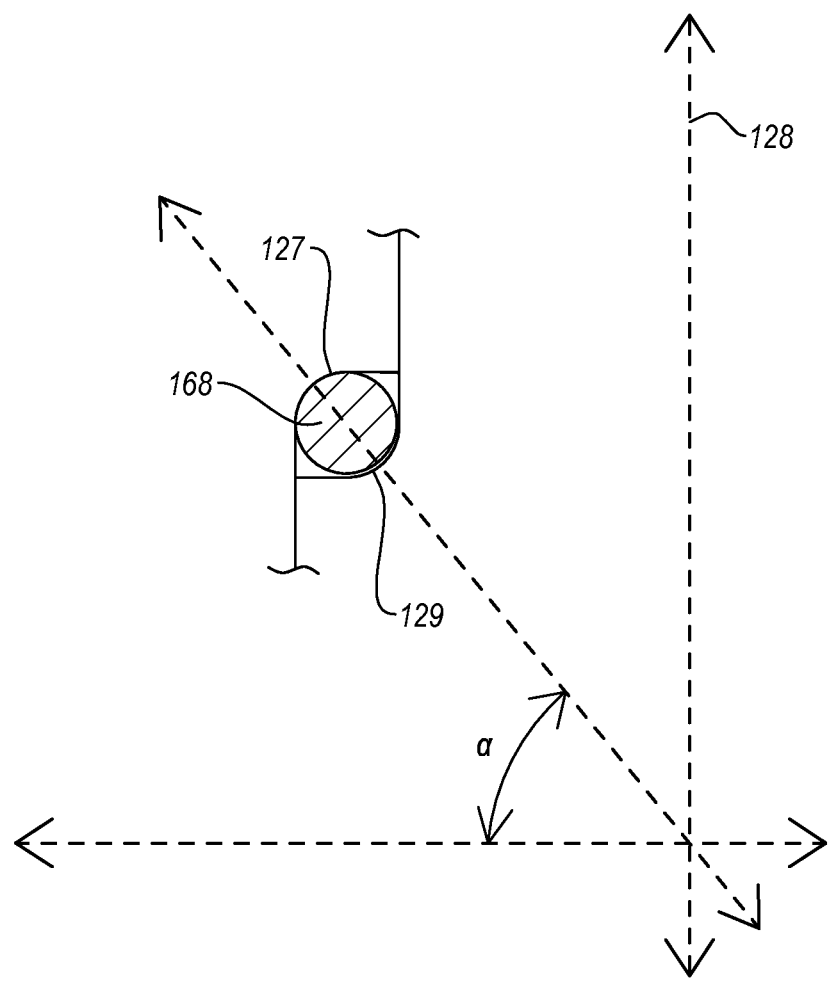
FIG. 10 is another partial cross-sectional view of the pipe lathe.

As best seen in FIGS. 9 and 10, the inner and outer raceway surfaces 123 and 125 can be displaced regarding each other in the relation of the axis 128. They may accommodate and support combined loads, i.e., simultaneously acting radial and axial loads. The load distribution of the bearing assembly 158 is enhanced. The bearing assembly 158 can accept both axial and radial loads independent of the bearing assembly 160 (shown in FIG. 2).

The lower bearing elements 168 in the return portion 190 of the lower bearing track 186 can be in contact with and arranged to cooperate with an inner raceway surface 127. The inner raceway surface 127 can include the concave surface of the lower bearing track 186 and an outer raceway surface 129 comprising a concave surface on the support housing 102 that extends between the inner annular shoulder 126 and a radially facing portion of the support housing 102. The lower bearing elements 168 in the return portion 190 can be unloaded at least in part because the inner raceway surface 127 and the outer raceway surface 129 do not move relative to one another. Rotation of the headstock 104 does not directly cause the lower bearing elements 168 in the return portion 190 to circulate. Rather, the circulation of the lower bearing elements 168 in the load bearing portion 188 drives or causes the lower bearing elements 168 in return portion to rotate, roll and/or circulate around the lower bearing track 186.

It will be appreciated this return portion 190 of the lower bearing track 186 is arranged to allow clearance between the lower bearing elements 168 and the support housing 102, allowing the lower bearing elements 168 to circulate. Like the lower bearing elements 168 in the load bearing portion 188, the contact points between the lower bearing elements 168 and the inner raceway surface 127 and the outer raceway surface 129 can be dynamic and momentary. This has the effect of reducing or eliminating the formation of witness marks in a work piece as described in more detail below.

Further, because the lower bearing elements 168 are only loaded part of the time during operation, the operational life of the lower bearing elements 168 may be increased compared to a conventional bearing assembly used in pipe lathes where the bearing elements are constantly loaded during operation of the pipe lathe. This has the effect of increasing heat dissipation from the lower bearing elements 168. This also helps to reduce the friction and heat created between the support housing 102 and the headstock 104, increasing the power transmission efficiency of the pipe lathe 100.

The upper bearing elements 166 in the load bearing portion 111 of the upper bearing track 109 can be in contact with and arranged to cooperate with an inner raceway surface 131. The inner raceway surface 131 can include a portion of the concave surface on the upper bearing track 109 and an outer raceway surface 133 comprising a first portion of the headstock 104 or a concave surface formed on the headstock 104. The inner and outer raceway surfaces 131 and 133 can be offset, allowing the load bearing portion 111 to support combined loads. As the outer raceway surface 133 on the headstock 104 rotates it causes the upper bearing elements 166 in the load bearing portion 111 to rotate as well. Similar to the lower bearing elements 168 in the load bearing portion 188, the contact points between the upper bearing elements 166 and the inner raceway surface 131 and the outer raceway surface 133 can be dynamic and momentary.

The upper bearing elements 166 can contact the headstock 104 on the inner radial side of the bearing assembly 158 and the lower bearing elements 168 contact the headstock 104 on the outer radial side of the bearing assembly 158. As the headstock 104 rotates about the axis 128, the upper bearing elements 166 and the lower bearing elements 168 circulate about the bearing assembly 158 in opposite directions. This has the effect of dissipating heat and/or distributing loads throughout the headstock 104 and/or the bearing assembly 158, reducing bearing failure.

Because the bearing assembly 158 and bearing assembly 160 operate independently, the load throughout the headstock and lathe is more evenly distributed. The load in the first segment of the headstock 104 is distributed by the bearing assembly 158 and the load in the second segment of the headstock 104 is distributed by the bearing assembly 160, reducing the likelihood of overloading one of the bearing assemblies, which increases its operational life.

The upper bearing elements 166 in the return portion 113 of the upper bearing track 109 can be in contact with and arranged to cooperate with an inner raceway surface 135. The inner raceway surface 135 can include a portion of the concave surface in the upper bearing track 109 and an outer raceway surface 137 comprising the interior surface of the outer radial wall 121 of the retainer cover 172 and the bottom side of the upper wall 119 of the retainer cover 172. In the illustrated embodiment, the upper bearing elements in the return portion 113 contact three raceway surfaces. However, it will be appreciated that the upper bearing elements can be configured to make two or any other suitable number of points of contact.

Similar to the lower bearing elements 168 in the return portion 190, the return portion 113 is sized and configured to allow clearance between the upper bearing elements 166 and the retainer cover 172 such that the lower bearing elements 168 can pass through and are only loaded part of the time during operation of the pipe lathe 100, increasing the operation life of the upper bearing elements 166.

As seen in FIG. 10, the geometry of the bearing assembly 158 may be arranged to influence operation of the bearing assembly 158. The capacity of the bearing assembly 158 to support thrust loads may increase by increasing a contact angle α. Conversely, the capacity of the bearing assembly 158 to support radial loads may increase by decreasing the contact angle α. The contact angle α is the angle between a line joining points of contact of the bearing elements 168 and the raceway surfaces (e.g., 127, 129), along which the load is transmitted from one raceway surface to another, and a line perpendicular to the axis 128. In an embodiment, the contact angle α of the bearing elements may be between about 10 degrees and about 45 degrees, about 12 degrees and about 30 degrees, or about 15 degrees to about 22.5 degrees. In other embodiments, the contact angle α of the bearing elements may be greater or smaller.

Due to the displacement between the raceway surfaces formed on the upper and lower races 162, 164 and the headstock 104 and the support housing 102 and/or the curvature of the raceways, the bearing assembly 158 may allow for some misalignment or deflection during operation. Changes in the temperature of a pipe lathe can change the size and shape of the support housing and bearing elements which can negatively affect the stability and precision of the pipe lathe.

Because the raceway surfaces can tolerate some degree of misalignment due to changes in size and shape of the support housing and/or bearing elements, the stability and precision of the pipe lathe 100 relative to a conventional pipe lathe can be improved. This allows the bearing assembly 158 to tolerate imperfections in the work piece or other impact loads that may be present during operation of the pipe lathe 100. It will be appreciated that the pipe lathe 100 may include any suitable means for lubricating the bearing assemblies 158, 160. Further, one or more seals 141 may be provided within the pipe lathe 100 for preventing entry of contamination into the bearing assemblies 158, 160 and/or gear ring 136. The seals 141 can comprise any suitable seal.

In operation, as the headstock 104 is rotated about the axis 128, the upper bearing elements 166 in the load bearing portion 111 of the upper bearing track 109 are made to rotate and run in a first direction between the outer raceway surface 133 and the inner raceway surface 131. As the upper bearing elements 166 reciprocate or travel through the load bearing portion 111, axial and/or radial loads are transmitted from the headstock 104 to the support housing 102 via the upper bearing elements 166 and the upper race 162. The upper bearing elements 166 then come out of the load bearing portion 111 and enter into and run though one of the turnarounds 143 where the upper bearing elements 166 run and turn about 180 degrees. The upper bearing elements 166, in a substantially unloaded state, then enter into the return portion 113 where they rotate and run in a second direction between the inner raceway surface 135 and the outer raceway surface 137. The second direction being generally opposite the first direction.

From the return portion 113, the upper bearing elements 166 enter the other turnaround 143 where the upper bearing elements 166 turn about 180 degrees and return to the loaded bearing portion 111 where they are again made to rotate and run in the first direction. This recirculation of the upper bearing elements 166 is continued during rotational movement of the headstock 104. It will be appreciated that the upper bearing elements 166 are recirculated in the reverse direction when the headstock 104 is rotated in the reverse direction.

Referring now to the lower bearing track 186, as the headstock 104 is rotated about the axis 128, the lower bearing elements 168 in the load bearing portion 188 are made to rotate and run in the first direction between the outer raceway surface 125 and the inner raceway surface 123. The lower bearing elements 168 and the upper bearing elements 166 circulate about the lower bearing track 186 and the upper bearing track 109 in opposite directions.

As the lower bearing elements 168 travel or reciprocate through the load bearing portion 188, axial and/or radial loads are transferred from the headstock 104 to the support housing 102 via the lower bearing elements 168 and the lower race 164. The lower bearing elements 168 then come out of the load bearing portion 188 and run through one of the turnarounds 192 where the lower bearing elements 168 turn about 180 degrees. The lower bearing elements 168 then enter into the return portion 190 where they rotate and run in the second direction between the inner raceway surface 127 and the outer raceway surface 129. From the return portion 190, the lower bearing elements 168 enter the other turnaround 192 where the lower bearing elements 168 turn about 180 degrees and return to the load bearing portion 188 where they are again made to rotate and run in the second direction. This recirculation of the lower bearing elements 168 is continued during rotational movement of the headstock 104. It will be appreciated that the lower bearing elements 168 are recirculated in the reverse direction when the headstock 104 is rotated in the reverse direction.

During operation of the pipe lathe 100, the upper bearing elements 166 and/or the lower bearing elements 168 can have a coefficient of friction that is lower than the coefficient of friction of sliding contact bearing elements found in many conventional pipe lathes. The upper bearing elements 166 and the lower bearing elements 168 can produce less heat thereby limiting the level of thermal distortion within the bearing assembly 158 and/or other components of the pipe lathe 100. In addition, the upper bearing elements 166 and the lower bearing elements 168 are only loaded part of the time the headstock 104 is rotating (i.e., the bearing elements are not loaded in the return portions or the turnarounds).

The heat dissipation from the upper bearing elements 166 and the lower bearing elements 168 can be increased as the bearing elements rest in the return portions and turnarounds. Such a configuration can allow the pipe lathe 100 to operate at higher cutting speeds due to less heat generation. Further, the bearing assembly 158 can help the pipe lathe 100 operate at lower operating temperatures. The arrangement of the bearing elements within the bearing assembly 158 help to reduce the friction and heat created between the support housing 102 and the headstock 104 increasing the power transmission efficiency of the pipe lathe 100.

Further, because the upper bearing elements 166 and the lower bearing elements 168 are rotating and rolling, the contact points between the bearing elements and the inner raceway surface 123 and outer raceway surface 133 on the headstock 104 are momentary and constantly changing, reducing two bearing elements contacting the split line 108 at the same time. This is advantageous because if two bearing elements are allowed to simultaneously contact the split line 108, a skip or interruption can be produced that can then transfer to the work piece as a witness mark, or wave.

Such a witness mark or wave can show up as a visible line in the machined surface of the work piece and is worsened by the split line intersecting the traditional fixed V-guided bearing(s) arrangement mounted within the stationary housing. Further, the witness line depth and severity worsens over time and age of the machine as the rotating element wears. In contrast to the fixed contact points of the traditional V-guided bearings, the bearing assembly 158 provides for multi dynamic contact locations of two or more bearing elements as they intersect with the split line 108, substantially reducing or eliminating witness marks.

The bearing assembly 158 can further include other features to help reduce two bearing elements contacting the split line 108 at the same time. The upper bearing elements 166 can contact the headstock 104 at a different diameter or distance from the axis 128 (shown in FIG. 1) than the lower bearing elements 168. In the same time, the lower bearing elements 168 in the load bearing portion 188 travel a longer distance around the axis 128 than the upper bearing elements 166 in the load bearing portion 111. The upper bearing elements 166 and the lower bearing elements 168 travel at different speeds. Because of the traveling speed differential between the upper bearing elements 166 and the lower bearing elements 168, the likelihood of two bearing elements contacting the split line 108 at the same time is reduced. Further, the likelihood of two bearing elements contacting the split line 108 at the same time is reduced because the upper bearing elements 166 and the lower bearing elements 168 circulate about the bearing assembly 158 in different directions.

The number and arrangement of bearing assemblies described is to be exemplary only, as any suitable number and/or arrangement of bearing assemblies are possible. At least one of the bearing assemblies may comprise a recirculating bearing assembly including an upper race having first raceway and lower race including a second raceway. The first raceway may include a first load bearing portion and the second raceway may include a second load bearing portion. The bearing elements in the first and second load bearing portions may contact the headstock 104 at substantially the same distance from the axis of rotation 128.

In other embodiments, bearing elements in the first load bearing portion may have a first diameter and the bearing elements in the second load bearing portion may have a second diameter different from the first diameter. Further while a pipe lathe is described, it will be appreciated that the bearing assemblies described can be utilized with any suitable apparatus or machinery. The configuration and arrangement of the support housing 102 and headstock 104 described may be regarded as exemplary only, as any suitable arrangement and/or configuration of the support housing 102 and headstock 104 are possible. In addition, while the bearing assemblies 158 and 160 are described being disposed within a pipe lathe, it will be appreciated that the bearing assemblies 158 160 can be disposed within any suitable rotating machining device including, but not limited to, lathes, multi-axis spindles, milling machines, and/or boring machines.

While various aspects and embodiments have been disclosed, other aspects and embodiments are contemplated. The aspects and embodiments disclosed are for illustration and are not intended to be limiting. The words "including," "having," and variants thereof (e.g., "includes" and "has") as used, including the claims, shall be open ended and have the same meaning as the word "comprising" and variants thereof (e.g., "comprise" and "comprises").

The invention claimed is:

1. A rotating machining device comprising:
   a segmented support housing arranged to be mounted on a work piece;
   a segmented headstock mounted on the support housing and rotatable relative to the support housing about an axis;
   at least one bearing assembly disposed between the headstock and the support housing, the at least one bearing assembly including:
      a first race including a first set of bearing elements arranged to dynamically contact a first portion of the headstock and recirculate within the at least one bearing assembly in a first direction; and
      a second race including a second set of bearing elements arranged to dynamically contact a second portion of the headstock and recirculate within the at least one bearing assembly in a second direction opposite the first direction so as to promote distribution of a load applied to the at least one bearing assembly.

2. The rotating machining device of claim 1, wherein the first bearing elements dynamically contact the first portion of the headstock on an inner radial side of the at least one bearing assembly and the second bearing elements dynamically contact the second portion of the headstock on an outer radial side of the at least one bearing assembly.

3. The rotating machining device of claim 1, wherein the first bearing elements recirculate within the at least one bearing assembly at a first speed and the second bearing elements recirculate within the at least one bearing assembly at a second speed different than the first speed so as to reduce the likelihood of witness marks on the work piece.

4. The rotating machining device of claim 1, wherein the first race includes an arcuate first bearing track comprising:
   a load bearing portion arranged to contact the first bearing elements and transfer a load from the first portion of the headstock to the support housing via the first bearing elements;
   a return portion arranged to at least in part unload the first bearing elements to promote heat dissipation from the first bearing elements; and
   two turnaround portions.

5. The rotating machining device of claim 1, further comprising a retainer cover removably attached to an upper side of the first race, the retainer cover least in part retaining the first bearing elements and the second bearing elements in the at least one bearing assembly when the rotating machining device is diametrically split along a split line of the rotating machining device.

6. The rotating machining device of claim 1, wherein the retainer cover comprises an arcuate member including an upper wall attached to the upper side of the first race and an outer radial wall extending downwardly from the upper wall.

7. The rotating machining device of claim 5, further comprising a pair of bearing retainer end caps attached to end surfaces of the first race or the second race, the bearing retainer end caps at least in part retaining the first bearing elements and the second bearing elements in the at least one bearing assembly when the rotating machining device is diametrically split along a split line of the rotating machining device.

8. The rotating machining device of claim 7, wherein at least one of the bearing retainer end caps includes a U-shaped groove facing the end surface and configured to facilitate alignment of the first bearing elements in the first race or the second bearing elements in the second race.

9. The rotating machining device of claim 7, wherein the retainer cover and the bearing retainer end caps retain the first bearing elements and the second bearing elements in the at least one bearing assembly when the segmented headstock is removed from the segmented support housing.

10. The rotating machining device of claim 1, wherein the at least one bearing assembly has a substantially semi-circular shape that substantially fits within a first half of the headstock.

11. The rotating machining device of claim 1, further comprising a plurality of bolt members extending through the support housing and arranged to selectively pull the at least one bearing assembly back into the support housing so as to adjust the amount of pressure exerted on the at least one bearing assembly by the support housing.

12. The rotating machining device of claim 1, wherein the first race includes inner and outer raceway surfaces that are axially offset such that the first bearing elements support both axial and radial loads.

13. The rotating machining device of claim 1, further comprising one or more set screws extending through the second race and arranged for adjusting the spatial relationship between the first race and the second race.

14. The rotating machining device of claim 1, wherein the first bearing elements contact the first portion of the headstock at a first distance from the axis and the second bearing elements contact the second portion of the headstock at a second distance from the axis that is greater than the first distance such that second bearing elements recirculate within the at least one bearing assembly at a greater speed than the first bearing elements.

15. A bearing assembly for use with a rotating machining device comprising:
a first race and a second race disposed between a segmented headstock and a segmented support housing of a rotating machining device, the first race including a first set of bearing elements arranged to dynamically contact a first portion of the headstock on an inner radial side of the bearing assembly and recirculate within the bearing assembly in a first direction, and the second race including a second set of bearing elements arranged to dynamically contact a second portion of the headstock on an outer radial side of the bearing assembly and recirculate within the bearing assembly in a second direction opposite the first direction.

16. The bearing assembly of claim 15, further comprising:
a pair of bearing retainer end caps attached to end surfaces of at least one of the first race or the second race; and
a retainer cover situated along an upper side of the first race, an outer radial side of the first race, and an outer radial side of the second race,
wherein the bearing retainer end caps and the retainer cover retain the first bearing elements and the second bearing elements in the bearing assembly when the rotating machining device is diametrically split along a split line of the rotating machining device.

17. The bearing assembly of claim 15, wherein the second bearing elements are loaded and unloaded as the second bearing elements recirculate within the bearing assembly so as to reduce the amount of friction and heat created between the headstock and the support housing.

18. The bearing assembly of claim 15, wherein the first race and the second race are disposed between a first half of the headstock and a corresponding first half of the support housing.

19. A pipe lathe comprising:
a segmented support housing arranged to be mounted on a work piece;
a segmented headstock mountable on the support housing and rotatable relative to the support housing about an axis;
an arcuate first bearing assembly disposed between a first half of the headstock and a first half of the support housing, the first bearing assembly including:
a first race including a first set of bearing elements arranged to dynamically contact a first portion of the headstock and recirculate within the first bearing assembly;
a second race including a second set of bearing elements arranged to dynamically contact a second portion of the headstock and recirculate within the first bearing assembly;
a pair of bearing retainer end caps attached to end surfaces of at least one of the first race or the second race; and
a retainer cover situated along an upper side of the first race and at least an outer radial side of the first race, wherein the bearing retainer end caps and the retainer cover retain the first bearing elements and the second bearing elements in the first bearing assembly when the pipe lathe is diametrically split along a split line separating the first half of the headstock and the second half of the headstock; and
a second bearing assembly disposed between a second half of the headstock and a second half of the support housing.

20. The pipe lathe of claim 19, wherein the contact points between the first bearing elements and the first portion of the headstock are dynamic such that the likelihood of one of the first bearing elements and one of the second bearing elements contacting the split line of the headstock at the same time is reduced.

* * * * *